US007031269B2

(12) United States Patent
Lee

(10) Patent No.: US 7,031,269 B2
(45) Date of Patent: Apr. 18, 2006

(54) ACOUSTIC ECHO CANCELLER

(75) Inventor: Way-Shing Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 592 days.

(21) Appl. No.: 10/368,888

(22) Filed: Feb. 18, 2003

(65) Prior Publication Data

US 2003/0174661 A1 Sep. 18, 2003

Related U.S. Application Data

(63) Continuation of application No. 09/199,530, filed on Nov. 24, 1998, now Pat. No. 6,563,803.

(60) Provisional application No. 60/066,562, filed on Nov. 26, 1997.

(51) Int. Cl.
*H04B 3/20* (2006.01)

(52) U.S. Cl. ...................... 370/290; 370/286; 370/287; 370/289; 370/342

(58) Field of Classification Search ................ 370/286, 370/287, 288, 289, 342
See application file for complete search history.

(56) References Cited

U.S. PATENT DOCUMENTS

| | | | | |
|---|---|---|---|---|
| 5,307,405 | A | 4/1994 | Sih | |
| 5,414,796 | A | 5/1995 | Jacobs et al. | |
| 5,646,991 | A | 7/1997 | Sih | |
| 5,687,229 | A * | 11/1997 | Sih | 379/406.09 |
| 5,920,834 | A * | 7/1999 | Sih et al. | 704/233 |
| 6,181,794 | B1 * | 1/2001 | Park et al. | 379/406.08 |

* cited by examiner

*Primary Examiner*—William Luther
(74) *Attorney, Agent, or Firm*—Philip Wadsworth; Charles D. Brown; Howard H. Seo

(57) ABSTRACT

An apparatus and method for echo cancellation is presented. The echo canceller comprises an adaptive filter that tracks the impulse response of the echo path and produces an estimate of the echo. Filter adaptation is controlled by a controller based on the rate of the far-end speech signal, the rate of the near-end signal, an acoustic loss measure, and a double talk hangover indicator. The controller may also comprise a step size adaptation unit for determining the adaptation step size of the adaptive filter. In addition, the controller may comprise a noise replacement unit, which controls replacement of the echo residual signal with comfort noise to ensure echo is completely rejected when only the far-end speaker is talking.

32 Claims, 8 Drawing Sheets

ACOUSTIC ECHO CANCELLER

CLAIM OF PRIORITY UNDER 35 U.S.C. §120

The present Application for Patent is a Continuation of patent application Ser. No. 09/199,530 entitled "ACOUSTIC ECHO CANCELLER" filed Nov. 24, 1998, now U.S. Pat. No. 6,563,803, which also claims the benefit of Provisional Application No. 60/066,562, filed Nov. 26, 1997 and assigned to the assignee hereof and hereby expressly incorporated by reference herein.

BACKGROUND

I. Field of the Invention

The present invention relates to speech processing. More particularly, the present invention relates to an apparatus and method for echo cancellation that is especially suitable for acoustic echo cancellation.

II. Description of the Related Art

Transmission of voice by digital techniques has become widespread, particularly in cellular telephone and personal communication systems (PCS) applications. This, in turn, has created an interest in improving speech processing techniques. One area in which improvements have been developed is that of echo cancellation.

There are two types of echo cancellers, the network echo canceller and the acoustic echo canceller. A network echo canceller cancels the echo produced in the telephone network. A land-based telephone is connected to a central office by a two wire line to support transmission in both directions. For calls farther than about 35 miles, the two directions of transmission must be segregated onto physically separate wires, resulting in a four-line wire. The device that interfaces the two-wire and four-wire segments is known as a hybrid. An impedance mismatch at the hybrid results in an echo, which must be removed by a network echo canceller. Acoustic echo cancellers are often used in teleconferencing and hands-free telephony applications. For example, an acoustic echo canceller may eliminate acoustic echo resulting from the feedback between a loudspeaker and a microphone.

In FIG. 1, a block diagram of a traditional echo canceller 100 is shown. The echo canceller 100 may be either a network echo canceller or an acoustic echo canceller. Speech signals from the two callers are labeled as far end speech signal x(n) and near-end speech signal v(n). In a network echo canceller, the reflection of x(n) off the hybrid (not shown) is modeled as passing x(n) through an unknown echo channel 102 to produce the echo signal y(n). In an acoustic echo canceller, having speech signal x(n) broadcast from a loudspeaker and picked up by a microphone is modeled as passing x(n) through the unknown echo channel 102, producing echo signal y(n). Echo signal y(n) is summed at a summer 104 with near-end speech signal v(n). It should be noted that the unknown echo channel 102 and the summer 104 are not included elements in the echo canceller but are artifacts of the system and are illustrated for reference purposes only.

To remove low-frequency background noise, the sum of the echo signal y(n) and the near-end speech signal v(n) is high-pass filtered through a high pass filter (HPF) 106 to produce a signal r(n). The signal r(n) is provided as one input to a summer 108 and to the near-end speech detection unit 110.

The other input of the summer 108 (a subtract input) is coupled to the output of an adaptive filter 112. The adaptive filter 112 receives the far-end speech signal x(n) and a feedback of the echo residual signal e(n) output from the summer 108. In canceling the echo, the adaptive filter 112 continually tracks the impulse response of the echo path, and an echo replica from the output of HPF 106 is subtracted from the signal r(n) by the summer 108. The adaptive filter 112 also receives a control signal from the near-end speech detection unit 110 so as to freeze the filter adaptation process when near-end speech is detected.

The echo residual signal e(n) is also output to the near-end speech detection unit 110 and a center-clipper 114. The output of the center-clipper 114 is provided as the echo cancellation signal.

Although the adaptive digital filtering performed by the traditional echo canceller is satisfactory, the adaptive filter 112 normally cannot precisely replicate the channel, thus resulting in some residual echo. Furthermore, the residual echo processing by the center-clipper 114 causes a problem in digital cellular and PCS systems. The center-clipper 114 eliminates the residual echo by passing the signal through a nonlinear function that sets to zero any signal portion that falls below a threshold A and passing unchanged any signal segment that lies above the threshold A. Since digital systems may be sensitive to nonlinear effects, center-clipping causes degradation in voice quality.

An exemplary echo canceller which provides high dynamic echo cancellation for improved voice quality, and which addresses the nonlinearity problem, is disclosed in U.S. Pat. No. 5,307,405, entitled "NETWORK ECHO CANCELLER," which is assigned to the assignee of the present invention and incorporated by reference herein, and also in U.S. Pat. No. 5,646,991, entitled "NOISE REPLACEMENT SYSTEM AND METHOD IN AN ECHO CANCELLER," also assigned to the assignee of the present invention and incorporated by reference herein.

The echo canceller of U.S. Pat. Nos. 5,307,405 and 5,646,991 makes use of at least two adaptive filters for obtaining a better estimate of the echo. One filter performs the echo cancellation, while another filter performs state determination by keeping track of the presence of near-end and far-end speech. A noise analysis/synthesis feature eliminates the non-linear effects of the center-clipper by replacing the echo residual signal with a synthesized noise signal when appropriate.

The echo canceller of U.S. Pat. Nos. 5,307,405 and 5,646,991 may be used for both network and acoustic echo cancellation, although it is more suitable for use as a network echo canceller. Network echo cancellers cancel echoes due to hybrids. Because the echo caused by hybrids has a long delay, the adaptive filters are generally required to have a large number of filter tap coefficients to accommodate the long delay. For example, an adaptive filter having 256 filter tap coefficients may be suitable. The large number of filter tap coefficients provides for accuracy in estimating and canceling the echo, but also imposes high processing power requirements. The use of multiple adaptive filters further increases processing power requirements. The high processing power is generally available in a central station, where a network echo canceller may be implemented. Thus, an echo canceller having high processing power requirements may be suitable for network echo cancellation applications.

However, for applications having limited processing power, an echo canceller characterized by multiple adaptive filters with a large number of filter taps will not be suitable. One application in which processing power is generally limited is that of a mobile telephone. In a mobile telephone, acoustic echo cancellation may be necessary to cancel echo resulting from the feedback between the loudspeaker and the microphone. Also known as the ear seal echo, the echo is the leaking far-end voice picked up by the microphone through the acoustic channel on the near-end (mobile side). To prevent the echo from being delivered back to the far-end speaker, echo cancellation is necessary. The echo canceller must be able to cancel acoustic echo with a high degree of precision. Furthermore, the echo cancellation must be performed using limited resources. These problems and deficiencies are recognized and solved by the present invention in the manner described below.

SUMMARY OF THE INVENTION

The present invention is an improved apparatus and method for echo cancellation. The echo canceller of the present invention may be implemented in systems having limited processing resources. The echo canceller comprises an adaptive filter that tracks the impulse response of the echo path and produces an estimate of the echo. Filter adaptation is controlled by a controller based on the rate of the far-end speech signal, the rate of the near-end signal, an acoustic loss measure, and a double talk hangover indicator. A rate estimator determines the rate of the far-end speech signal and the rate of the near-end signal. The rate at which a frame of data is encoded in a variable rate communications system may be indicative of the presence or absence of speech. An acoustic loss unit measures the acoustic loss, defined to be the energy of the far-end speech signal divided by the energy of the near end signal. A double talk hangover unit determines the double talk hangover indicator. The double talk hangover indicator is set to prevent filter adaptation when both the near-end and the far-end are active or when the near-end is active but the far-end is inactive. To more accurately determine the status of the near-end and the status of the far-end, the double talk hangover indicator may also be based on the acoustic loss measure and the status of a timer.

The controller may also comprise a step size adaptation unit for determining the adaptation step size of the adaptive filter. The step size may be increased for faster adaptation when it is determined that the adaptive filter has not yet converged.

In addition, the controller may comprise a noise replacement unit. In a situation where only the far-end speaker is talking, it may be desirable to output comfort noise instead of the echo residual signal to ensure echo is completely rejected. To prevent the far-end speaker from detecting any change in signal characteristics, a comfort noise generator synthesizes noise to match the power and characteristics of the actual background noise. The noise replacement unit generates a control signal to specify the replacement of the echo residual signal by comfort noise.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

The present invention provides an echo canceller that is suitable for applications having limited processing power, such as the cancellation of ear seal echo. Instead of using multiple adaptive filters, the echo canceller of the present invention is characterized by one adaptive filter controlled by a controller. The number of taps of the adaptive filter is adjustable based on processing requirements. Accordingly, the echo canceller of the present invention is particularly suitable where processing resources are limited.

Figure 1:
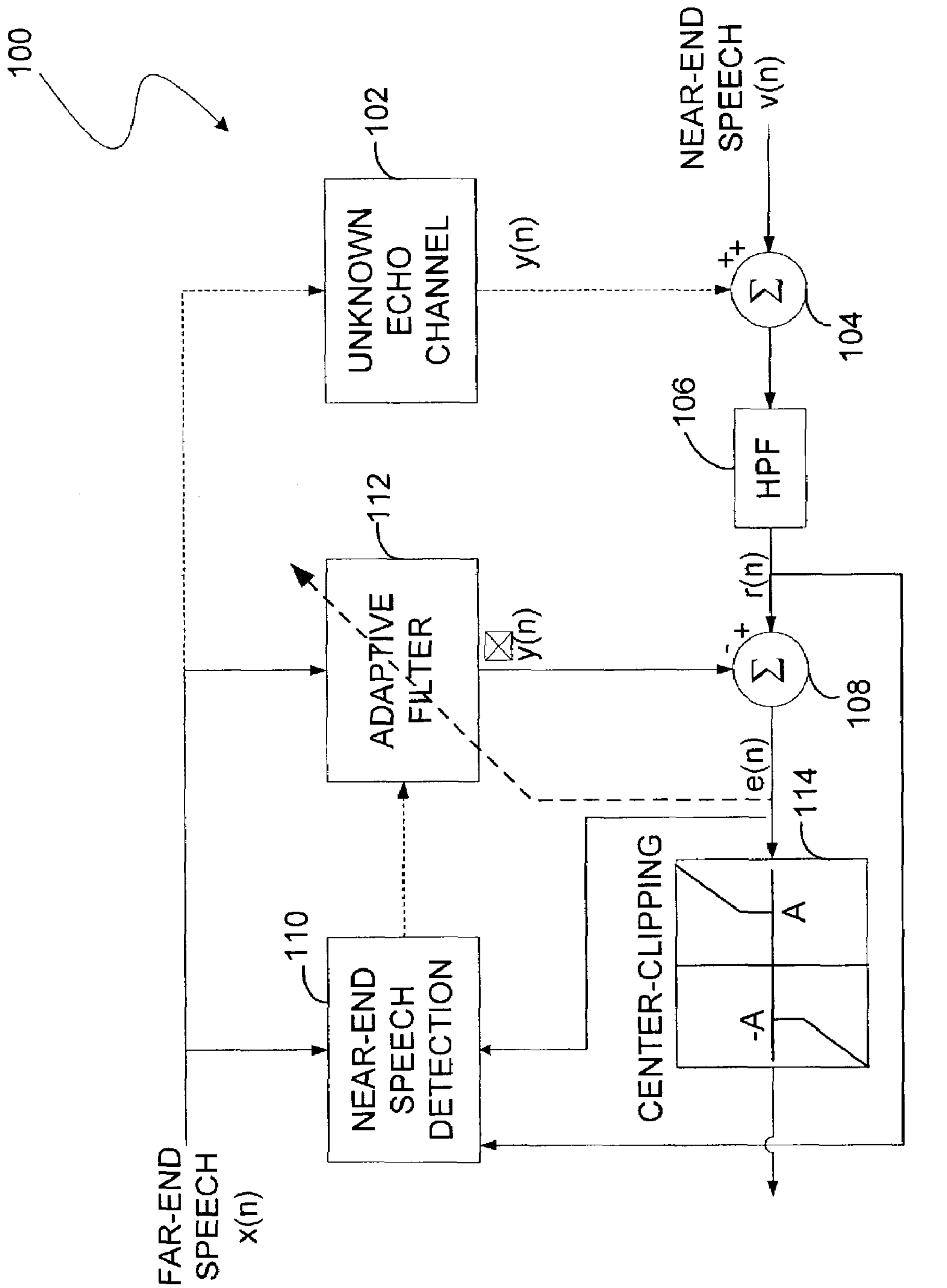
FIG. 1 is a block diagram of a traditional echo canceller.
Figure 2:
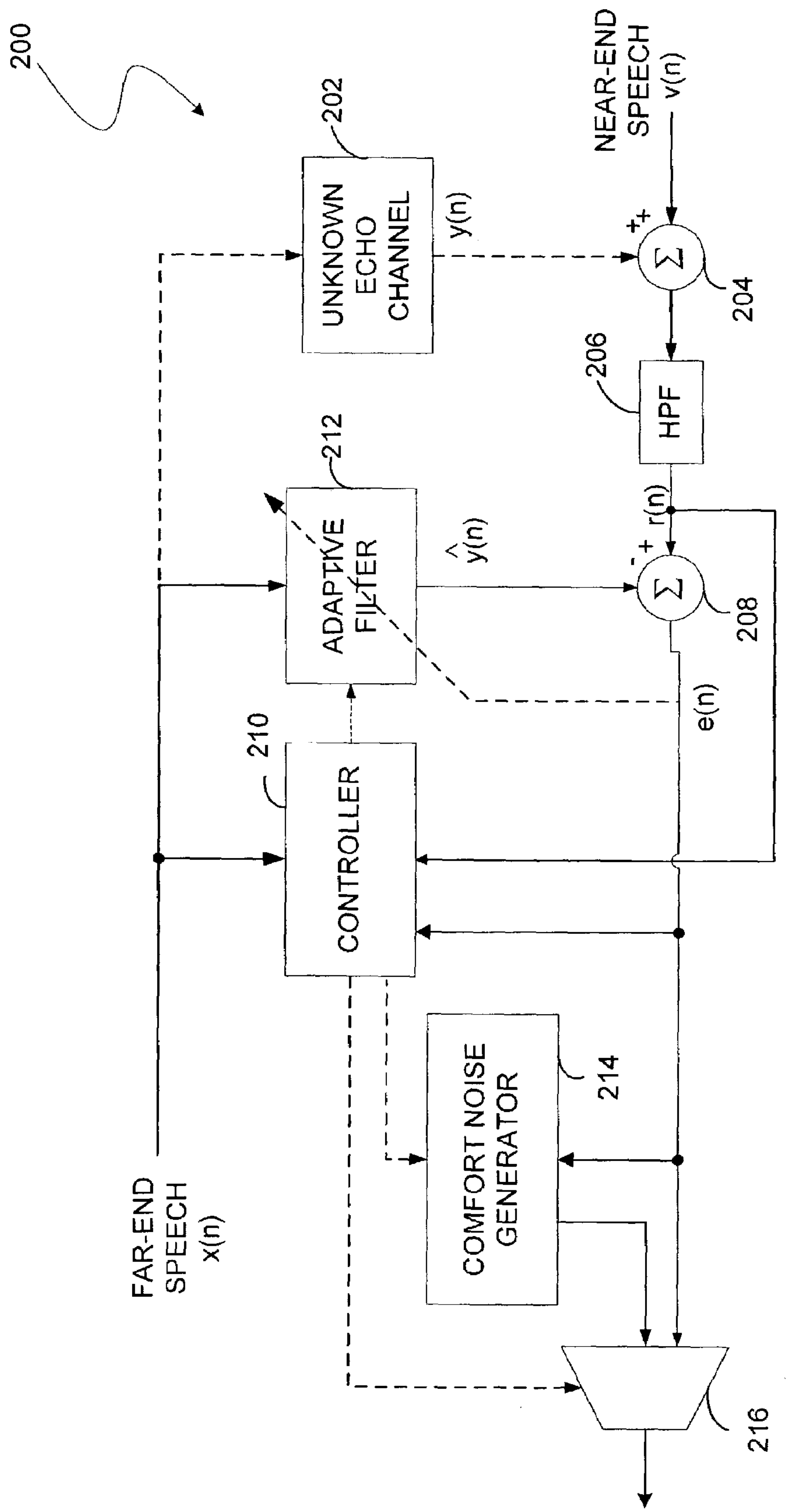
FIG. 2 is a block diagram of the echo canceller of the present invention.

The echo canceller of the present invention is illustrated in FIG. 2 and labeled 200. As in FIG. 1, speech signals from the two callers are labeled as far-end speech signal x(n) and near-end speech signal v(n). The far-end speech signal x(n) is passed through an unknown echo channel 202 to produce the echo signal y(n). The unknown echo channel 202 may be an ear seal echo channel, so that the speech signal x(n) broadcast from a loudspeaker is picked up by a microphone of a wireless telephone to produce the echo signal y(n). The echo signal y(n) is summed at a summer 204 with the near-end speech signal v(n). The unknown echo channel 202 and the summer 204 are not included elements of the echo canceller but are artifacts of the system.

To remove low-frequency background noise, the sum of the echo signal y(n) and the near-end speech signal v(n) is high-pass filtered through a high pass filter (HPF) 206 to produce a near-end signal r(n). Note that the signal r(n) is referred to as the near-end signal, whereas the signal v(n) is referred to as the near-end speech signal. The near-end signal r(n) is provided to a summer 208 and to a controller 210.

The summer 208 also has a subtract input, which is coupled to the output of an adaptive filter 212. The adaptive filter 212 receives the far-end speech signal x(n) and a feedback of the echo residual signal e(n) output from the summer 208. In canceling the echo, the adaptive filter 212 tracks the impulse response of the echo path. The adaptive filter 212 produces, which is subtracted from the near-end signal r(n) by the summer 208. In a preferred embodiment, adaptive filtering is performed by a least-mean-square (LMS) algorithm as described in U.S. Pat. No. 5,307,405 mentioned above. The number of taps of the filter may be programmable. In a preferred embodiment, the adaptive filter 212 is configured to have 64, 48, or 32 filter tap coefficients, depending on the processing resources available and the expected delay of the echo. The controller 210 in a manner to be described later controls filter adaptation of the adaptive filter 212.

The echo residual signal e(n) is also provided to the controller 210, a comfort noise generator 214, and a multiplexer 216. Based on analysis of x(n), r(n), and e(n), the controller 210 determines whether the output of the echo canceller should be the residual signal e(n) or the comfort noise generated by the comfort noise generator 214. Details of the noise replacement decision will be explained later.

The controller 210 provides a control signal to the multiplexer 216 for selection of either the residual signal e(n) or the comfort noise as output.

Figure 3:
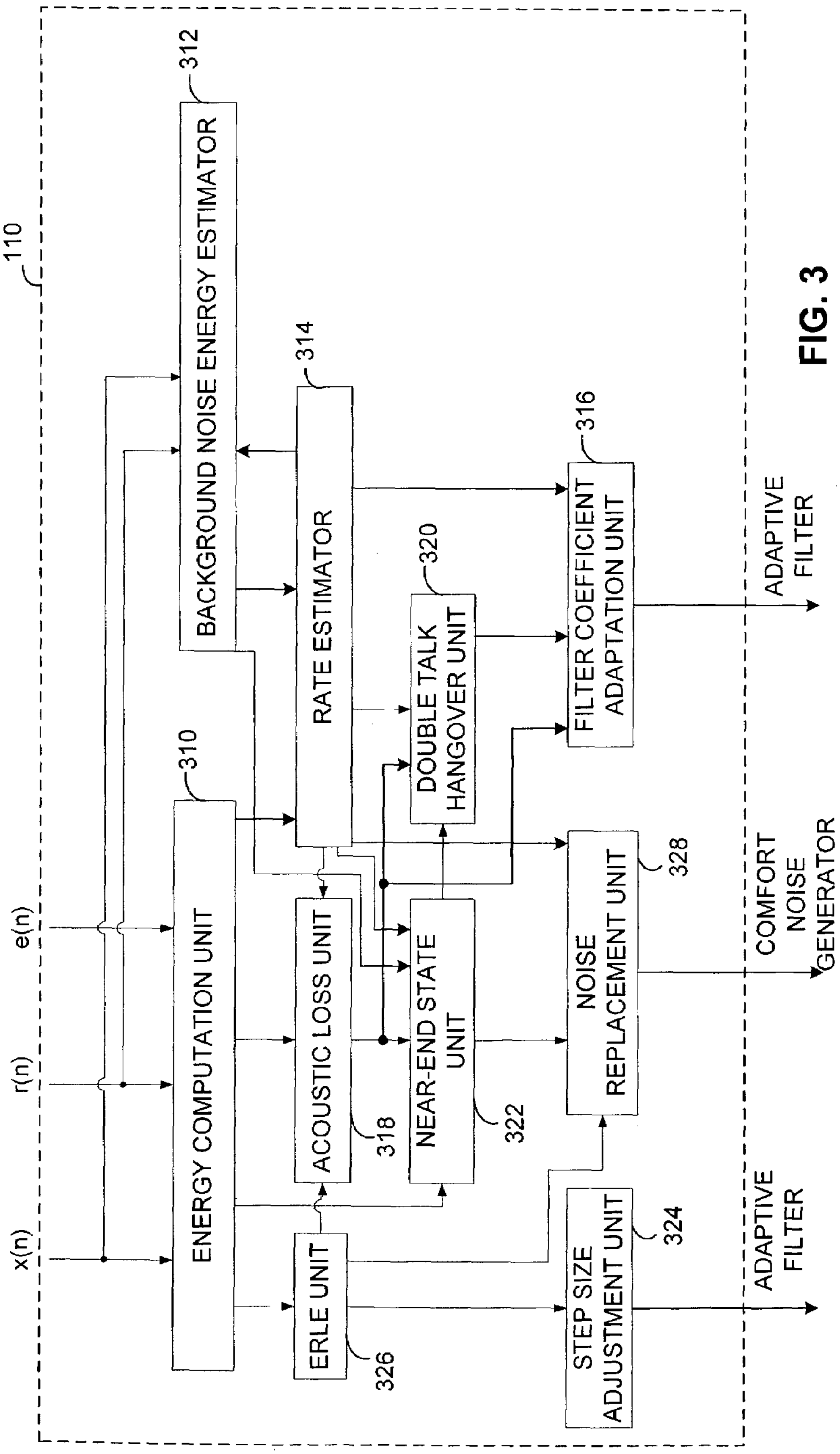
FIG. 3 is a block diagram of the functional elements of the controller of the present invention.

Referring now to FIG. 3, an exemplary embodiment of the functional elements of the controller 210 is shown. The controller 210 receives as inputs the far-end signal x(n), the near-end signal r(n), and the residual signal e(n).

The controller 210 comprises an energy computation unit 310, which receives the signals x(n), r(n), and e(n) as inputs. The controller 210 also comprises a background noise energy estimator 312, which receives the signals x(n) and r(n) as inputs. The energy computation unit 310 measures the energy of the input signals. The background noise energy estimator 312 determines the noise energy updates of the signals x(n) and r(n) when the rate estimator 314 indicates that no speech is present in signals x(n) and/or r(n). The rate estimator 314 determines the data rates of the signals x(n) and r(n) in a variable rate communication system. A determination by the rate estimator 314 of a data rate below a threshold would indicate that no speech is present in a particular signal, and would enable the background noise energy estimator 312 to update its background noise estimate.

In a variable rate communication system, data is encoded so that the data rate may be varied from one frame to another. The voice coder, which encodes data based on a variable rate scheme, is typically called a variable rate vocoder. An exemplary embodiment of a variable rate vocoder is described in U.S. Pat. No. 5,414,796, entitled "VARIABLE RATE VOCODER," assigned to the assignee of the present invention and incorporated by reference herein. The use of a variable rate communications channel eliminates unnecessary transmissions when there is no useful speech to be transmitted. Algorithms are utilized within the vocoder for generating a varying number of information bits in each frame. For example, a vocoder with a set of four rates may produce 20 millisecond data frames containing 16, 40, 80, or 171 information bits. The four rates may be referred to as eighth rate, quarter rate, half rate, and full rate, with a full rate frame being encoded by the most number of bits. It is desired to transmit each data frame in a fixed amount of time by varying the transmission rate of communications.

The rate of a frame provides information regarding the presence or absence of speech. In a system utilizing variable rates, a determination that a frame should be encoded at the highest rate generally indicates the presence of speech, while a determination that a frame should be encoded at the lowest rate generally indicates the absence of speech. Intermediate rates typically indicate transitions between the presence and the absence of speech.

The rate estimator 314 may implement any of a number of rate decision algorithms. In one embodiment, rate estimator 314 uses energy thresholds relative to the background noise energy level provided by background noise energy estimator 312 to determine the voice activity level, and thereby the rate, at which the input samples are to be encoded. The voice activity level is a measure of the percentage of time a speaker is actually talking during a conversation. If the energy of the current frame of speech samples is far above the background noise energy, then rate estimator 314 will determine that the frame is to be encoded at full rate. If the energy of the current frame is close to the background noise energy, then rate estimator 314 will determine that the frame is to be encoded at eighth rate.

A more sophisticated rate decision technique is disclosed in copending U.S. patent application Ser. No. 08/286,842, entitled "METHOD AND APPARATUS FOR PERFORMING REDUCED RATE VARIABLE RATE VOCODING," assigned to the assignee of the present invention and incorporated by reference herein. This rate decision technique determines the rate for a given frame of speech based on the psychoacoustic significance of a frame of speech. The psychoacoustic significance is related to the temporal masking auditory phenomena. Temporal masking occurs as preceding high energy speech frames of similar frequency content masks low energy speech frames. Because the human ear is integrating energy over time in various frequency bands, low energy frames are time averaged with high energy frames, thus lowering the coding requirements for the low energy frames. A set of mode measures indicative of the psychoacoustic phenomena are generated, and based on the set of mode measures, an encoding rate is selected for the frame of speech.

The rate estimates from the rate estimator 314 are provided to a filter coefficient adaptation unit 316. The filter coefficient adaptation unit 316 additionally receives as inputs acoustic loss measurements provided by an acoustic loss unit 318 and a double talk hangover indicator from a double talk hangover unit 320. The filter coefficient adaptation unit 316 determines whether the adaptive filter 212 (FIG. 2) should update its filter tap coefficients based on inputs from the rate estimator 314, the acoustic loss unit 318, and the double talk hangover unit 320. The filter coefficient adaptation unit 316 provides to the adaptive filter 212 a signal which enables or disables filter adaptation.

Figure 4:
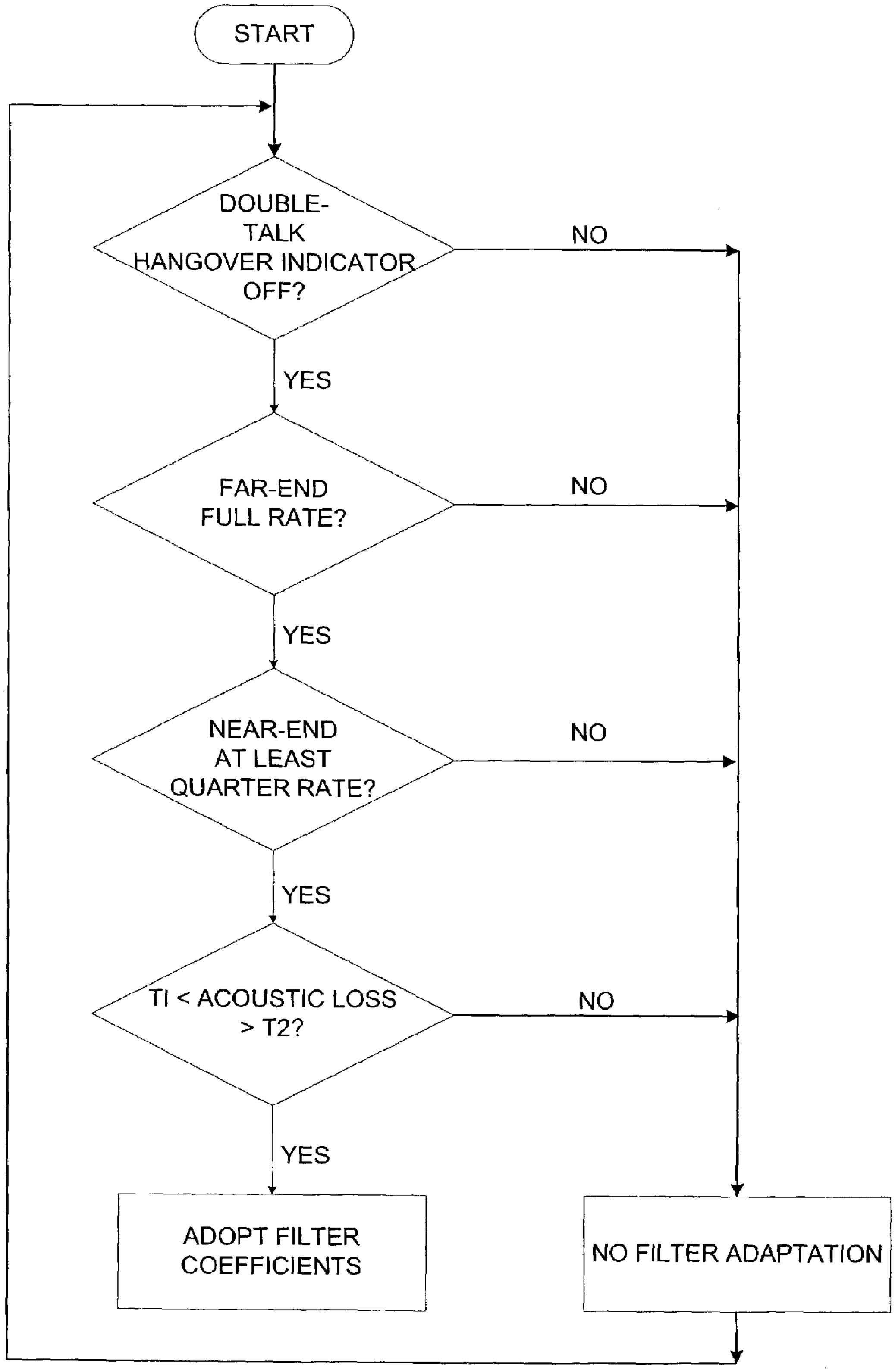
FIG. 4 is a flow chart illustrating the steps involved in the decision to update the coefficients of the adaptive filter.

A flow diagram of the steps undertaken by filter coefficient adaptation unit 316 in determining whether or not adaptive filter 212 should update its coefficients is shown in FIG. 4. As shown in FIG. 4, only when the double talk hangover indicator is off, the far-end speech signal x(n) is at full rate, the near-end signal r(n) is at at least quarter rate, and the acoustic loss is between thresholds T1 and T2 will filter coefficient adaptation be enabled. In a preferred embodiment, T1=9 dB and T2=39 dB.

The rates of the far-end speech signal x(n) and the near-end signal r(n) are determined by the rate estimator 314 in the manner described above.

The acoustic loss is computed by the acoustic loss unit 318. Acoustic loss is based on the energy of the far-end speech signal x(n) and the energy of the near-end signal r(n). It is defined to be a ratio of the energy of x(n) to the energy of r(n). In a preferred embodiment, the acoustic loss measurement is updated every 1 msec.

The double talk hangover indicator is provided by the double talk hangover unit 320 based on inputs from the rate estimator 314, the acoustic loss unit 318, and the near-end state unit 322. Double talk refers to the condition wherein speech is received from both the near-end and the far-end. A double talk hangover indicator is designed to prevent the adaptive filter 212 from adapting its filter coefficients when the cross-correlation between the far-end speech signal x(n) and the residual signal e(n) is low.

The double talk hangover unit 320 receives the rate of the far-end speech signal x(n) from the rate estimator 314. Based on the rate of the far-end speech signal x(n), the double talk hangover unit 320 determines whether the far-end is active. In an embodiment wherein a set of four rates is utilized, a determination that the far-end speech signal x(n) is of full rate or half rate signifies that the far-end is active, while a determination that the far-end speech signal x(n) is of quarter or eighth rate signifies that the far-end is not active. The far-end state is used to determine whether or not the double talk indicator should be set.

The double talk hangover unit 320 receives the acoustic loss measure from acoustic loss unit 318. As described above, the acoustic loss is the ratio of the energy of the far-end speech signal x(n) to the energy of the near-end signal r(n). The acoustic loss measure is also used to determine whether or not the double talk indicator should be set.

The double talk hangover unit 320 receives the state of the near-end from a near-end state unit 322. The near-end state unit 322 utilizes a state machine to determine whether or not the near-end is active. The near-end active status is also used by the double talk hangover unit 320 to determine whether or not the double talk hangover indicator should be set. The near-end state unit 322 receives inputs from energy computation unit 310, the background noise energy estimator 312, the rate estimator 314, and the acoustic loss unit 318.

The rate estimator 314 provides the near-end rate to the near-end state unit 322. The near-end rate is one factor used to determine the near-end active status.

Another factor used for determining the near-end active status is the acoustic loss measure provided by the acoustic loss unit 318. The acoustic loss measure is compared with a maximum acoustic loss (AL_MAX) measure. In a preferred embodiment, maximum acoustic loss is tracked and updated every 2 seconds to preserve good characteristics of the ear seal channel. Maximum acoustic loss tracking is turned on while the far-end is active to obtain the attenuation factor of the channel. Acoustic loss is compared to a threshold, derived by lowering some variable amount (VAR) (e.g., 9, 15, or 21 dB) from AL_MAX. The result of the comparison provides information regarding single talk, double talk, and/or the presence of a soft speaker versus the presence of a loud echo. This information will in turn be used to adjust the variable amount (VAR) in determining the near-end status.

In a noisy near-end situation, a higher than average acoustic loss will be used to indicate that near-end is active, reducing the amount of energy needed to be marked as active. Thus, the acoustic loss measure will be compared with AL_MAX raised by a predetermined amount to determine whether or not the near-end is active.

In a situation wherein there is a very loud far-end speaker, the acoustic loss threshold will be lowered by a predetermined amount, thus increasing the level of near-end energy needed to be seen as active. When the far-end speaker is very loud, the echo of the far-end speaker will dominate the near-end signal r(n). In other words, there will be a loud echo. In this case, lowering the threshold guarantees that the loud echo will not falsely indicate that the near-end is active. If, at the same time, the near-end speaker is also speaking loudly, the far-end speaker cannot hear the near-end speaker with or without echo suppression, because the far-end speaker is dominating the conversation. Therefore, by lowering the threshold by some amount, the echo from the very loud far-end speaker may be prevented from being encoded as speech. In a preferred embodiment, if the energy of the far-end speech signal x(n) is above the far-end background noise estimate by 24 dB (considered super full rate), the acoustic loss threshold will be lowered by 6 dB.

Figure 5:
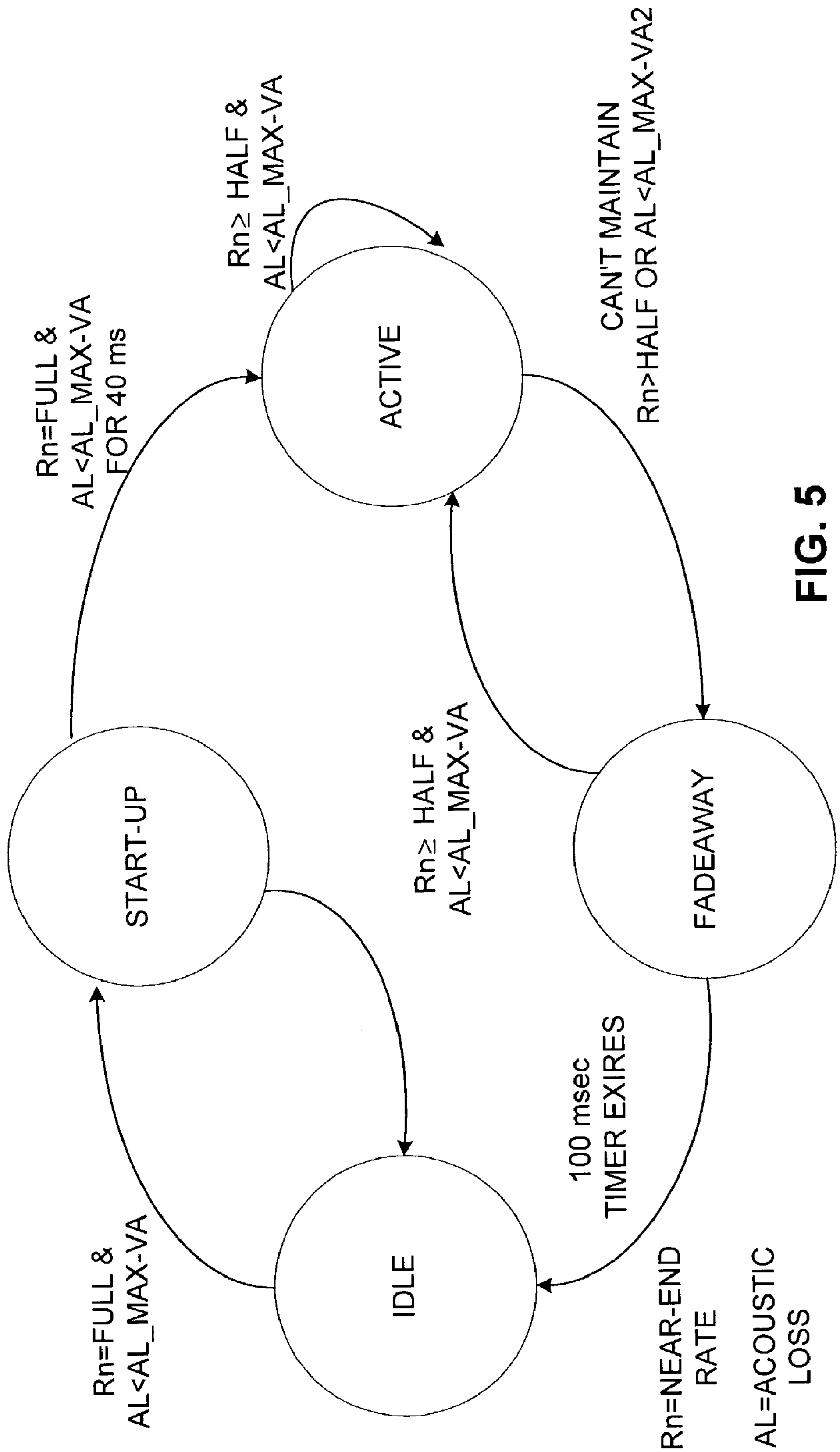
FIG. 5 is a state diagram illustrating the various states of the near-end state unit.

Referring now to FIG. 5, a state machine diagram used for determining the near-end active state is shown. In the idle state, the near-end is considered inactive. If the near-end signal r(n) is determined to be full rate and the acoustic loss is less than AL_MAX−VAR, then there is a transition to the start-up state. In a preferred embodiment, VAR=15 dB under ordinary conditions, and VAR=21 dB if the far-end speech signal x(n) is considered very loud.

If near-end signal r(n) falls below full rate or if the acoustic loss is higher than AL_MAX−VAR , then there is a transition back to the idle state. In a preferred embodiment, VAR=15 dB under ordinary conditions, and VAR=21 dB if the far-end is very loud. Otherwise, the state machine stays in the start-up state for a predetermined amount of time (e.g., 40 msec) before transitioning to the active state. By staying in the start-up state for a predetermined amount of time, a sudden burst of sound is prevented from being identified as voice.

To stay in the active state, near-end signal rate needs to be maintained at half rate or higher, and acoustic loss needs to be under AL_MAX−VAR2. In a preferred embodiment, VAR2=9 dB. If these conditions are not maintained, then there is a transition to the fade-away state.

The fade-away state is the transition state between the active and idle states. A timer of typically around 100 ms is set once the transition state is entered. If, before the timer expires, the near-end signal rate becomes at least half rate and acoustic loss is less than AL_MAX−VAR, there will be a transition back to active state. In a preferred embodiment, VAR=15 dB under ordinary conditions, and VAR=21 dB if the far-end is very loud. If the timer expires, then there is a transition to the idle state. In this fashion, frequent switching between active and idle states due to pauses between syllables may be prevented.

The near-end active status determined by the near-end state unit 322 is provided to double talk hangover unit 320. Recall that the far-end status and the acoustic loss measure are also provided to the double talk hangover unit 320 for generation of the double talk hangover indicator. The procedure by which the double talk hangover indicator is set is illustrated in FIG. 6.

Figure 6:
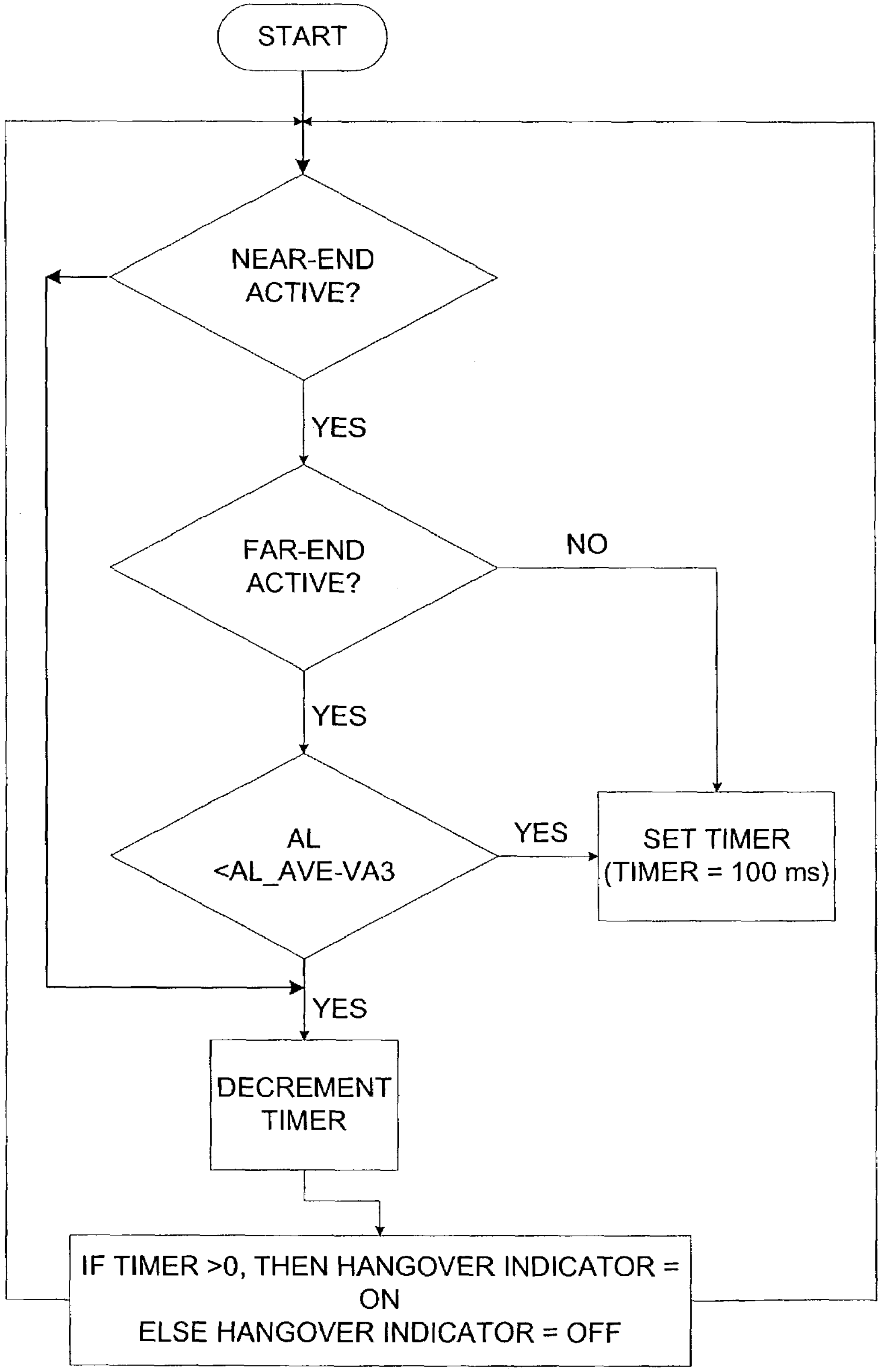
FIG. 6 is a flow diagram illustrating the steps involved in the decision to set the double talk hangover indicator.

Referring to FIG. 6, if the near-end is active and the far-end is not active, then the hangover indicator will be set to prevent filter adaptation. If both the near-end and far-end are active and the acoustic loss is less than an average acoustic loss—VAR3 (VAR3=9 dB in a preferred embodiment), then the hangover indicator is also set because the near-end signal is assumed to contain enough independent energy source other than the echo. If neither of the above is true, a timer will expire after a certain amount of time (typically 100 ms) before the hangover indicator is turned off. Otherwise, the timer will be reset for another 100 ms. The use of the timer prevents filter adaptation during pauses between syllables of near-end speech.

Figure 7:
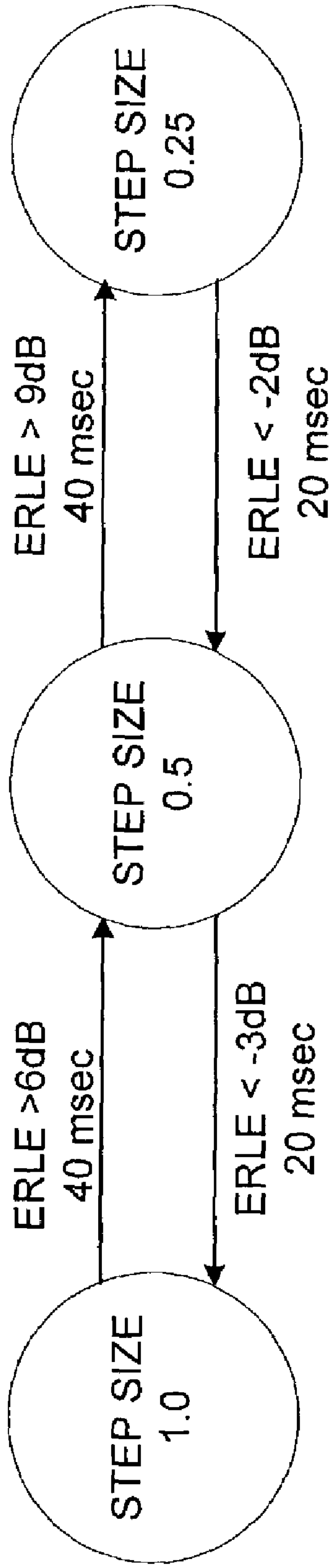
FIG. 7 is a state diagram illustrating the various states of the adaptation step size adjustment unit.

Another function of controller 110 is to determine the adaptation step size of the adaptive filter 212 (FIG. 2). In FIG. 3, it can be seen that a step size adjustment unit 324 determines the adaptation step size based on input from an ERLE unit 326. The instantaneous error return loss enhancement (ERLE) is defined to be the energy of the near-end signal r(n) to the energy of the residual signal e(n). A preferred embodiment of adaptation step size adjustment is illustrated in FIG. 7. Although actual step sizes and timing values are provided for illustrative purposes, it should be understood that the values may be adjusted for the specific application.

Three different step sizes (1.0, 0.5, and 0.25) are used to gear-shift the adaptation speed of the adaptive filter at different convergence states. The convergence state is related to the ERLE measure. During start-up of the echo canceller, a step size of 1.0 is used for fastest adaptation. Once ERLE is larger than 6 dB for 40 msec, a step size of 0.5 is used. If ERLE stays larger than 9 dB for 40 msec, step size will drop to 0.25. On the other hand, if ERLE drops to −2 dB for 20 ms, a step size of 0.5 is used for faster adaptation of filter coefficients. If ERLE drops even further to −3 dB for another 20 msec, a 1.0 step size is used for fastest adaptation.

In addition to step size adjustment, step size adjustment unit 324 may provide Q factor adjustment for the filter coefficients. The Q factor refers to the number of fractional bits in a word. Generally, filter coefficients are signed 16-bit words. The higher the dynamic range represented by the coefficients, the lower the precision maintained. By dynamically adjusting the Q factor, the filter may be tuned at a higher precision if the convergence state is achieved, or at a lower precision when convergence is barely being maintained so that arithmetic overflow will not cripple the filter. Q factor adjustment may be performed for each frame, using the step size as a sign of convergence. If step size is 1.0, indicating that convergence is not achieved, the Q factor is adjusted to reserve a 3-bit margin in the coefficients to allow for wide dynamic range for adaptation. If step size is 0.5 or 0.25, indicating that ERLE is at least 6 dB, the Q factor will be re-adjusted to reserve a 1-bit margin, so that a higher precision of filter coefficients can be used. In general, the range of Q factor is limited within Q8 and Q24.

Finally, controller 110 comprises a noise replacement unit 328 for determining whether the output of the echo canceller should be comfort noise generated by the comfort noise generator 114 or the residual signal e(n) (FIG. 2). If only the far-end speaker is talking, it may be desirable to output comfort noise instead of the residual signal to ensure echo is completely rejected. To prevent the far-end speaker from detecting any change in signal characteristics, the comfort noise generator 114 synthesizes noise to match the power and characteristics of the actual background noise during the most recent period of silence. One embodiment of the noise analysis/synthesis feature is disclosed in U.S. Pat. No. 5,646,992 mentioned above.

Figure 8:
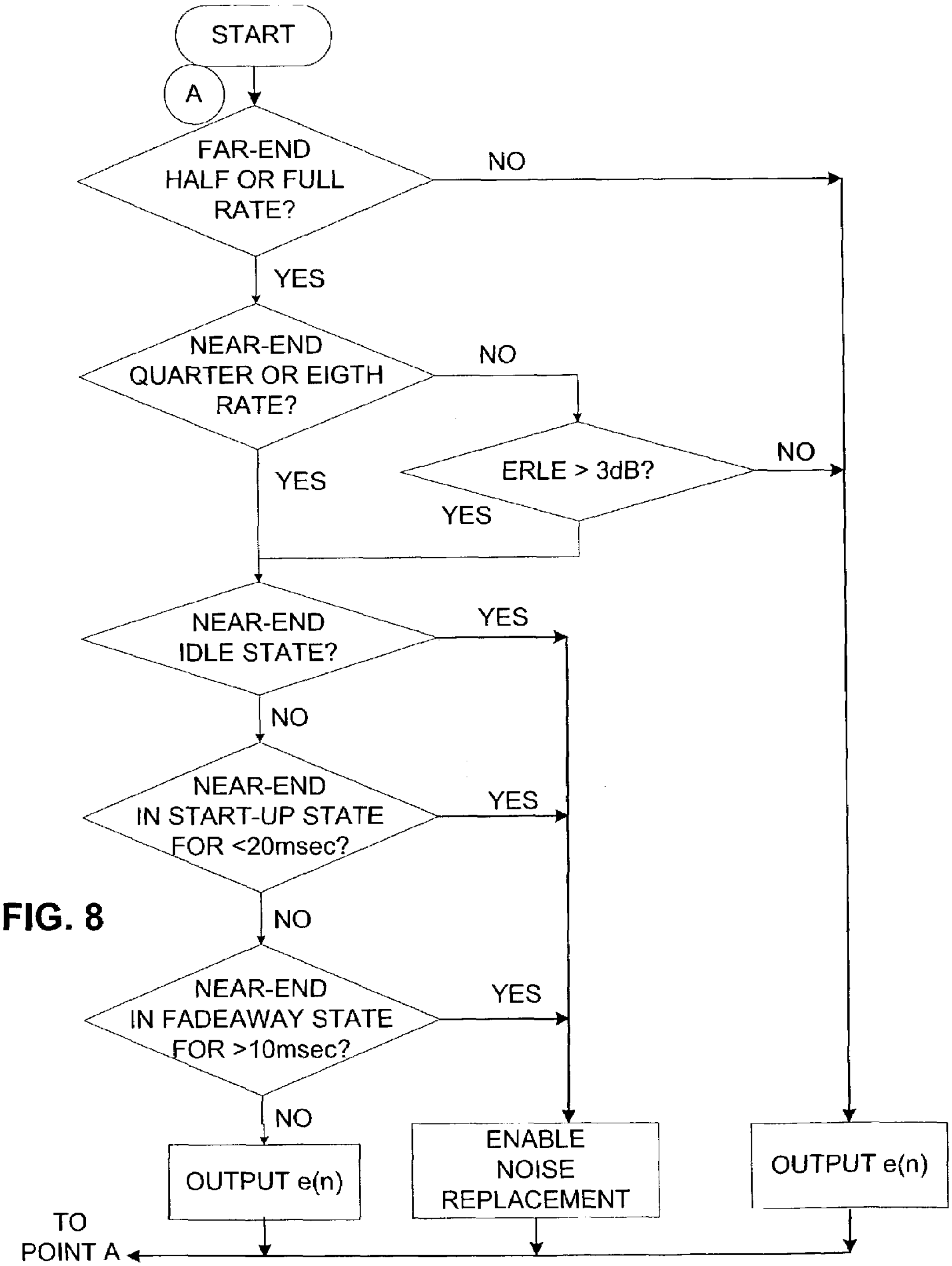
FIG. 8 is a state diagram illustrating the steps involved in the decision

The noise replacement unit 328 makes the decision for enabling the comfort noise generator based on input from the rate estimator 314, the ERLE unit 326, and the near-end state unit 322. A flow diagram illustrating the steps involved in making the decision is provided in FIG. 8. In a preferred embodiment, two checks are performed before a noise replacement decision is made. Generally, a noise replacement decision is made for each encoder frame. Only when both checks are positive will noise replacement be performed upon the entire encoder frame. To determine that noise replacement should be made, the current state should be both:

1. far-end speech signal x(n) is half or full rate, and
   near-end signal r(n) is quarter or eighth rate, or
   near-end signal r(n) is half or full rate, and ERLE is larger than 3 dB; and
2. near-end active flag is among:
   idle state,
   start-up state for less than 20 msec, or
   fade away state for longer than 10 msec.

If both checks are met, then the noise replacement unit 328 will provide a signal enabling the comfort noise generator 114. Additionally, a signal will be provided to multiplexer 116 enabling it to output the comfort noise generated by comfort noise generator 114. Otherwise, the output of the echo canceller is the residual signal e(n).

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for canceling echo in a system where echo of a far-end speech signal is combined with a signal from a near-end, comprising:

an adaptive filter having a plurality of filter tap coefficients for generating an echo estimate signal, said filter tap coefficients updated in response to a first control signal;

a controller for generating said first control signal in accordance with the rate of said far-end speech signal and the rate of a near-end signal which combines said signal from said near-end and said echo signal, said rates being ones of a predetermined set of rates in a variable rate communications system; comprising:

energy computation unit adapted to measure the energy of input signals;

background noise estimator adapted to determine the noise energy when no speech is present; and a rate estimator adapted to determine data rates of the far-end and near-end signals; and a summer for subtracting said echo estimate signal from said near-end signal to generate an echo residual signal.

2. The apparatus of claim 1, wherein said controller generates said first control signal further in accordance with an acoustic loss measure representative of a ratio of the energy of said far-end speech signal to the energy of said near-end signal.

3. The apparatus of claim 1, wherein said controller generates said first control signal further in accordance with a double talk hangover indicator which is set to prevent filter adaptation when both said far-end and said near-end are active or when said near-end is active but said far-end is inactive, said far-end or near-end being considered active when speech is detected at said far-end or near-end, respectively.

4. The apparatus of claim 3, wherein said near-end active status is determined using a state machine based on the rate of said near-end signal, an acoustic loss measure representative of a ratio of the energy of said far-end speech signal to the energy of said near-end signal, and the status of a timer.

5. The apparatus of claim 3, wherein said double talk hangover indicator is set further based on an acoustic loss measure representative of a ratio of the energy of said far-end speech signal to the energy of said near-end signal.

6. The apparatus of claim 5, wherein said double talk hangover indicator is set further based on the status of a timer.

7. The apparatus of claim 6, wherein said controller generates said first control signal further in accordance with said acoustic loss measure representative of a ratio of the energy of said far-end speech signal to the energy of said near-end signal.

8. The apparatus of claim 7, wherein the rates of said far-end speech signal and said near-end signal are chosen from a set of rates comprising a full rate, a half rate, a quarter rate, and an eighth rate.

9. The apparatus of claim 8, wherein said controller generates said first control signal to specify update of said filter tap coefficients when said double talk hangover indicator is not set, said far-end speech signal is of full rate, said near-end signal is of at least quarter rate, and said acoustic loss measure is between a first threshold and a second threshold.

10. The apparatus of claim 1, wherein said controller generates a second control signal specifying the adaptation step size of said adaptive filter based on an error return loss enhancement measure representative of a ratio of the energy of said near-end signal to the energy of said echo residual signal.

11. The apparatus of claim 10, wherein said controller generates said second control signal further based on the status of a timer.

12. The apparatus of claim 1, further comprising a comfort noise generator for generating synthesized noise, wherein said controller generates a third control signal specifying that said echo residual signal should be replaced by said synthesized noise when said far-end is active indicative of speech originating from said far-end, and said near-end is inactive indicative of an absence of speech originating from said near-end.

13. The apparatus of claim 12, wherein the rates of said far-end speech signal and said near-end signal are chosen from a set of rates comprising a full rate, a half rate, a quarter rate, and an eighth rate.

14. The apparatus of claim 13, wherein said far-end is considered active when said far-end speech signal is of full rate or half rate, and either said near-end signal is of quarter rate or eighth rate, or said near-end signal is of full rate or half rate and an error return loss enhancement measure is above a third threshold, said error return loss enhancement measure being representative of a ratio of the energy of said near-end signal to the energy of said echo residual signal.

15. The apparatus of claim 12, wherein said near-end active status is determined using a state machine based on the rate of said near-end signal, an acoustic loss measure representative of a ratio of the energy of said far-end speech signal to the energy of said near-end signal, and the status of a timer.

16. An apparatus for canceling echo in a system where echo of a far-end speech signal is combined with a signal from a near-end, comprising:

- means for generating a first control signal in accordance with the rate of said far-end speech signal and the rate of a near-end signal which combines said signal from said near-end and said echo signal, said rates being ones of a predetermined set of rates in a variable rate communications system;
- means for updating a plurality of filter tap coefficients of an adaptive filter based on said first control signal;
- means for generating an echo estimate signal using said adaptive filter; and
- means for subtracting said echo estimate signal from said near-end signal to generate an echo residual signal.

17. The apparatus of claim 16, wherein the means for generating a first control signal generates said first control signal further in accordance with an acoustic loss measure representative of a ratio of the energy of said far-end speech signal to the energy of said near-end signal.

18. The apparatus of claim 16, wherein said means for generating a first control signal generates said first control signal further in accordance with a double talk hangover indicator which is set to prevent filter adaptation when both said far-end and said near-end are active or when said near-end is active but said far-end is inactive, said far-end or near-end being considered active when speech is detected at said far-end or near-end, respectively.

19. The apparatus of claim 18, further comprising means for determining said near-end active status using a state machine based on the rate of said near-end signal, an acoustic loss measure representative of a ratio of the energy of said far-end speech signal to the energy of said near-end signal, and the status of a timer.

20. The apparatus of claim 19, wherein the rate of said near-end signal is chosen from a set of rates comprising a full rate, a half rate, a quarter rate, and an eighth rate.

21. The apparatus of claim 20, wherein said means for determining said near-end status comprises:

- means for transitioning from an idle state to a start-up state when said near-end signal is of full rate and said acoustic loss measure is less than a first threshold;
- means for transitioning from said start-up state to said idle state when said near-end signal is less than full rate and said acoustic loss measure is greater than said first threshold;
- means for transitioning from said start-up state to an active state when said near-end signal is of full rate and said acoustic loss measure is less than said first threshold for a first predetermined amount of time;
- means for remaining in said active state when said near-end signal is of at least half rate and said acoustic loss measure is less than a second threshold;
- means for transitioning from said active state to a fade-away state when said near-end signal is of less than half rate or when said acoustic loss measure is less than said second threshold;
- means for transitioning from said fade-away state to said active state when said near-end signal is of at least half rate and said acoustic measure is less than said first threshold; and
- means for transitioning from said fade-away state to said idle state after being in said fade-away state for a second predetermined amount of time.

22. The apparatus of claim 18, wherein said double talk hangover indicator is set further based on an acoustic loss measure representative of a ratio of the energy of said far-end speech signal to the energy of said near-end signal.

23. The apparatus of claim 22, wherein said double talk hangover indicator is set further based on the status of a timer.

24. The apparatus of claim 23, wherein said means for generating a first control signal generates said first control signal further in accordance with said acoustic loss measure representative of a ratio of the energy of said far-end speech signal to the energy of said near-end signal.

25. The apparatus of claim 24, wherein the rates of said far-end speech signal and said near-end signal are chosen from a set of rates comprising a full rate, a half rate, a quarter rate, and an eighth rate.

26. The apparatus of claim 25, wherein said means for generating a first control signal generates said first control signal when said double talk hangover indicator is not set, said far-end speech signal is of full rate, said near-end signal is of at least quarter rate, and said acoustic loss measure is between a first threshold and a second threshold.

27. The apparatus of claim 16, further comprising means for generating a second control signal specifying the adaptation step size of said adaptive filter based on an error return loss enhancement measure representative of a ratio of the energy of said near-end signal to the energy of said echo residual signal.

28. The apparatus of claim 27, wherein the means for generating a second control signal generates said second control signal further based on the status of a time.

29. The apparatus of claim 16, further comprising:

means for synthesizing a comfort noise signal;

means for generating a third control signal when said far-end is active indicative of speech originating from said far-end, and said near-end is inactive indicative of an absence of speech originating from said near-end; and means for replacing said echo residual signal by said comfort noise signal based on said third control signal.

30. The apparatus of claim 29, wherein the rates of said far-end speech signal and said near-end signal are chosen from a set of rates comprising a full rate, a half rate, a quarter rate, and an eighth rate.

31. The apparatus of claim 30, wherein said far-end is considered active when said far-end speech signal is of full rate or half rate, and either said near end signal is of quarter rate or eighth rate, or said near-end signal is of full rate or half rate and an error return loss enhancement measure is above a third threshold, said error return loss enhancement measure being representative of a ratio of the energy of said near-end signal to the energy of said echo residual signal.

32. The apparatus of claim 29, wherein said near-end active status is determined using a state machine based on the rate of said near-end signal, an acoustic loss measure representative of a ratio of the energy of said far-end speech signal to the energy of said near-end signal, and the status of a timer.

* * * * *